United States Patent
Farrar et al.

(10) Patent No.: US 7,082,736 B2
(45) Date of Patent: Aug. 1, 2006

(54) PROCESS FOR RETROFITTING AN EXISTING BUS WINDOW HAVING RUBBER SEALS WITH METAL MEMBERS THAT DEFINE A RETENTION SPACE FOR A SACRIFICIAL MEMBER

(75) Inventors: Jerry L. Farrar, Banning, CA (US); Dale F. Carson, Murrieta, CA (US)

(73) Assignee: Transit Care, Inc., Panorama City, CA (US)

( * ) Notice: Subject to any disclaimer, the term of this patent is extended or adjusted under 35 U.S.C. 154(b) by 0 days.

(21) Appl. No.: 10/142,807

(22) Filed: May 9, 2002

(65) Prior Publication Data

US 2002/0184840 A1 Dec. 12, 2002

Related U.S. Application Data (63) Continuation-in-part of application No. 10/057,617, filed on Jan. 23, 2002, now Pat. No. 6,688,044, which is a continuation of application No. 09/395,692, filed on Sep. 13, 1999, now Pat. No. 6,408,574, which is a continuation-in-part of application No. 09/186,513, filed on Nov. 4, 1998, now Pat. No. 6,205,723

(60) Provisional application No. 60/290,136, filed on May 9, 2001.

(51) Int. Cl.
| | |
|---|---|
| *E04B 1/35* | (2006.01) |
| *E04B 1/62* | (2006.01) |
| *E04B 1/64* | (2006.01) |
| *E04B 1/66* | (2006.01) |

(52) U.S. Cl. ............. 52/741.1; 52/202; 52/204.53; 52/741.3

(58) Field of Classification Search ............ 52/202, 52/204.53, 204.62, 204.5, 741.3, 741.4; 296/146.1, 296/146.15

See application file for complete search history.

(56) References Cited

U.S. PATENT DOCUMENTS

| 1,605,583 A | 11/1926 | Heymer |
| 1,740,960 A | 12/1929 | Roberge |
| 2,191,500 A | 2/1940 | Rosling |
| 2,402,112 A | 6/1946 | Gee |

(Continued)

FOREIGN PATENT DOCUMENTS

| DE | 2038176 | | 9/1971 |
| EP | 106629 | | 4/1984 |
| GB | 715795 | | 9/1954 |
| WO | WO 00/26048 | * | 5/2000 |

OTHER PUBLICATIONS

U.S. Reissue Application No. 11/145,502 filed Jun. 3, 2005, Farrar et al.

Litigation–related documents Corresponding to Civil Case No. CV 05–02237–PA (CWx).*

*Primary Examiner*—Jeanette Chapman
*Assistant Examiner*—Yvonne M. Horton
(74) *Attorney, Agent, or Firm*—Jeffer, Mangels, Bulter & Marmaro, LLP (57) ABSTRACT

A process of retrofitting an existing window that uses a gasket to secure a sacrificial member and a glazing. The sacrificial member forms a replaceable protective barrier between the glazing and occupants of a vehicle such as a bus. The gasket is traditionally used to secure the sacrificial member and the glazing to the window. Over time, after several removal and re-installations during replacement of the sacrificial member or the glazing, the gasket typically becomes unfit for subsequent use. The gasket is replaced with a rigid retainer member that fits into an existing recess that receives the gasket. The retainer member secures the sacrificial member and the glazing to the window so as to permit repeated changes of the sacrificial member without removal of the retainer member.

24 Claims, 8 Drawing Sheets

U.S. PATENT DOCUMENTS

| | | |
|---|---|---|
| 2,449,264 A | 9/1948 | Wilkinson |
| 2,572,764 A | 10/1951 | Rogers et al. |
| 2,780,846 A | 2/1957 | Lyon |
| 2,966,707 A | 1/1961 | Ellis |
| 3,016,952 A | 1/1962 | Shero |
| 3,055,468 A | 9/1962 | Horejs et al. |
| 3,136,396 A | 6/1964 | Sullivan |
| 3,222,734 A | 12/1965 | Punt |
| 3,226,779 A | 1/1966 | Rust |
| 3,245,182 A | 4/1966 | Zierold |
| 3,349,517 A | 10/1967 | Johnson |
| 3,363,390 A | 1/1968 | Crane et al. |
| 3,381,416 A | 5/1968 | De Torres et al. |
| 3,449,863 A | 6/1969 | Koch, Jr. |
| 3,455,080 A | 7/1969 | Meadows |
| 3,667,179 A | 6/1972 | Elsenberg |
| 3,668,808 A | 6/1972 | Perina |
| 3,676,956 A | 7/1972 | Taylor et al. |
| 3,680,276 A | 8/1972 | Wright et al. |
| 3,727,664 A | 4/1973 | Mennuto |
| 3,745,704 A | 7/1973 | Covington |
| 3,783,543 A | 1/1974 | Hemgren |
| 3,861,081 A | 1/1975 | Maskell |
| 3,928,953 A | 12/1975 | Mazzoni et al. |
| 3,939,620 A | 2/1976 | Bero |
| 4,021,980 A | 5/1977 | Wilfong |
| 4,042,004 A | 8/1977 | Kwan |
| 4,068,428 A | 1/1978 | Peterson, III |
| 4,100,325 A | 7/1978 | Summers et al. |
| 4,115,973 A | 9/1978 | Anderson |
| 4,262,960 A | 4/1981 | Fifer |
| 4,278,286 A | 7/1981 | Kiba et al. |
| 4,333,283 A | 6/1982 | Ebata |
| 4,364,198 A | 12/1982 | Netti |
| 4,389,068 A | 6/1983 | Sengoku |
| 4,428,171 A | 1/1984 | Harbin |
| 4,431,228 A | 2/1984 | Grise |
| 4,471,589 A | 9/1984 | Schmidlin |
| 4,472,914 A | 9/1984 | DeBoef et al. |
| 4,487,448 A | 12/1984 | Griffin |
| 4,531,335 A | 7/1985 | Mangan |
| 4,561,223 A | 12/1985 | Gold et al. |
| 4,598,525 A | 7/1986 | Poore |
| 4,608,793 A | 9/1986 | Yost et al. |
| 4,608,796 A | 9/1986 | Shea, Jr. |
| 4,611,850 A | 9/1986 | Fujikawa |
| 4,715,513 A | 12/1987 | Shelton, Jr. |
| 4,723,809 A | 2/1988 | Kida et al. |
| 4,730,413 A | 3/1988 | Henry |
| 4,768,319 A | 9/1988 | Derner |
| 4,785,583 A | 11/1988 | Kawagoe et al. |
| 4,788,796 A | 12/1988 | Matthews |
| 4,799,344 A | 1/1989 | Francis |
| 4,800,681 A | 1/1989 | Skillen et al. |
| 4,835,927 A | 6/1989 | Michlovic |
| 4,924,628 A | 5/1990 | Ruby et al. |
| 4,998,392 A | 3/1991 | Massarelli et al. |
| 5,085,021 A | 2/1992 | Kunert |
| 5,123,211 A | 6/1992 | Schlicht et al. |
| 5,137,770 A | 8/1992 | Rothe et al. |
| 5,169,205 A | 12/1992 | James |
| 5,242,207 A * | 9/1993 | Carson et al. .......... 296/146.15 |
| 5,339,568 A | 8/1994 | Hanemaayer |
| D350,222 S * | 9/1994 | Hase |
| D350,322 S | 9/1994 | Carson et al. |
| 5,450,917 A | 9/1995 | Goddard |
| 5,509,711 A | 4/1996 | Gold |
| 5,522,191 A | 6/1996 | Wenner et al. |
| 5,529,366 A | 6/1996 | Gold |
| 5,546,704 A | 8/1996 | Maruoka |
| 5,551,195 A | 9/1996 | Vanderstukken |
| 5,613,325 A | 3/1997 | Mariel |
| 5,635,281 A | 6/1997 | Agrawal |
| 5,636,484 A | 6/1997 | DeBlock |
| 5,649,389 A | 7/1997 | Coddens |
| 5,702,148 A | 12/1997 | Vaughan et al. |
| 5,735,089 A * | 4/1998 | Smith et al. .................. 52/202 |
| 5,765,325 A | 6/1998 | DeBlock |
| 5,809,707 A * | 9/1998 | Bargados et al. ........ 52/204.62 |
| 5,820,201 A | 10/1998 | Jabalee |
| 5,893,600 A | 4/1999 | McManus |
| 5,907,927 A | 6/1999 | Lieb et al. |
| 5,913,785 A * | 6/1999 | Møller et al. |
| 6,007,899 A | 12/1999 | Yoshizawa |
| 6,010,180 A * | 1/2000 | Bureau et al. |
| 6,012,257 A | 1/2000 | Caplette |
| 6,047,500 A | 4/2000 | Caplette |
| 6,105,973 A | 8/2000 | Butler et al. |
| 6,131,339 A | 10/2000 | Ramus |
| 6,158,372 A | 12/2000 | Erskine |
| 6,164,715 A * | 12/2000 | Mosaner .................. 296/146.1 |
| 6,205,723 B1 * | 3/2001 | Farrar et al. .................. 52/202 |
| 6,206,453 B1 | 3/2001 | Farrar |
| 6,250,028 B1 * | 6/2001 | Caplette |
| 6,263,627 B1 | 7/2001 | Schonenbach et al. |
| 6,286,891 B1 | 9/2001 | Gage et al. |
| 6,312,043 B1 | 11/2001 | Blackburn et al. |
| 6,397,662 B1 | 6/2002 | Alkhoury |
| 6,408,574 B1 | 6/2002 | Farrar et al. |
| 6,419,298 B1 | 7/2002 | Farrar et al. |
| 6,425,215 B1 * | 7/2002 | Farrar ...................... 52/204.5 |
| 6,493,128 B1 | 12/2002 | Agrawal et al. |
| 6,585,311 B1 | 7/2003 | Farrar et al. |
| 2002/0003356 A1 | 1/2002 | Davis et al. |
| 2003/0057733 A1 | 3/2003 | Carson et al. |

\* cited by examiner

PROCESS FOR RETROFITTING AN EXISTING BUS WINDOW HAVING RUBBER SEALS WITH METAL MEMBERS THAT DEFINE A RETENTION SPACE FOR A SACRIFICIAL MEMBER

RELATED APPLICATIONS

This application claims the benefit of U.S. Provisional Application No. 60/290,136, filed on May 9, 2001, entitled "PROCESS FOR RETROFITTING AN EXISTING BUS WINDOW HAVING RUBBER SEALS WITH METAL MEMBERS THAT DEFINE A RETENTION SPACE FOR A SACRIFICIAL MEMBER" and also is a continuation in part of U.S. patent application Ser. No. 10/057,617, now U.S. Pat. No. 6,688,044 filed Jan. 23, 2002 entitled Quick Release Sacrificial Shield for Window Assembly, which was a continuation of U.S. patent application Ser. No. 09/395,692 filed Sep. 13, 1999, now U.S. Pat. No. 6,408,574 entitled Quick Release Sacrificial Shield For Window Assembly which was a continuation-in-part of U.S. patent application Ser. No. 09/186,513, filed Nov. 4, 1998, entitled Quick Release Sacrificial Shield For Window Assembly now U.S. Pat. No. 6,205,723, issued Mar. 27, 2001.

BACKGROUND OF THE INVENTION

1. Field of the Invention

The present invention relates to windows for mass transit vehicles and, in particular, concerns an apparatus and method for reconfiguring bus windows so as to replace rubber retention members with metal retention members that define a space to receive a sacrificial layer.

2. Description of the Related Art

Mass transit vehicles, for example buses and trains and the like, typically have a plurality of windows positioned adjacent the seats of the mass transit vehicles. One difficulty that mass transit vehicle operators experience is that passengers sitting inside the mass transit vehicle will often use sharp objects to scratch the glazing of the window thereby damaging the appearance of the window. Over time, mass transit vehicles, particularly those used in large urban areas, can have windows that are significantly obscured with scratched glazings that may contain offensive comments and slogans. Replacement of the glazing can be a particularly expensive proposition given the difficulty of removing the glazing from the window and the expense of purchasing a replacement sheet of glazing that is specifically sized to meet the contours of particular window opening of the mass transit vehicle.

To address this particular need, sacrificial layers are often positioned at the inner surface of the glazing wherein the sacrificial layer is interposed between the rider of the mass transit vehicle and the inner surface of the glazing. Typically, the sacrificial layer is a layer of inexpensive acrylic or plastic that can be more easily removed and replaced than the underlying glazing. Hence, users who would otherwise attempt to damage the glazing end up damaging the sacrificial layer that can then be easily replaced.

One common mechanism for retaining the sacrificial layer is to position a rubber gasket in the window frame so as to extend around the periphery of the opening of the window frame. This gasket can then define a space into which the edges of the sacrificial layer can be positioned so as to retain the sacrificial layer adjacent the glazing. Such a gasket also retains the glazing of the window within the frame. Thus, when the sacrificial layer and/or the glazing of the window is to be replaced, the rubber gasket needs to be removed from the frame. After the sacrificial layer and/or the glazing of the window is replaced, the gasket, frequently a new set, is repositioned in the window frame.

One difficulty with the use of such a rubber retainer is that replacement of the rubber can be a very time consuming and costly endeavor. In particular, the rubber retainer must be removed from the window frame, and over time such rubber retainer can no longer be used. Consequently, a new rubber retainer must then be installed into the window frame to replace the damaged rubber retainer. Installation of such a rubber retainer is often a very difficult and time consuming process which is even more exacerbated by the fact that most mass transit vehicles have multiple windows that require multiple retainers.

Hence, there is an ongoing need for window protectors and, in particular, sacrificial window protectors that can be more easily replaced at a reduced cost. To this end, there is a need for a reusable retainer for use in conjunction with the sacrificial layers.

SUMMARY OF THE INVENTION

The aforementioned needs are satisfied by a method of retrofitting an existing window in a mass transit vehicle with a replacement sacrificial member retention assembly. The method comprises extracting a rubber gasket from a recess formed in the frame of the window so that the rubber gasket no longer retains the sacrificial member adjacent a first side of a glazing of the window. The rubber gasket also no longer retains the glazing in the frame. The method further comprises sizing a rigid retainer such that the rigid retainer can be positioned in the recess. The method further comprises positioning a plurality of rigid retainers into the recess in the frame such that the rigid retainers are able to retain the sacrificial member adjacent the first side of the glazing. The rigid retainers are also able to retain the glazing in the frame. The method further comprises positioning a sacrificial member adjacent the first side of the glazing so as to be retained by the rigid retainers.

One implementation of the method further comprises, prior to positioning a plurality of rigid retainers, positioning a replacement glazing in the frame. The rigid retainer preferably comprises a first leg sized to fit into the recess in the frame, and a second leg that defines a space sized to receive the sacrificial member such that the sacrificial member is secured adjacent the first side of the glazing. The second leg retains the glazing in the frame by engaging the portion of the first side of the glazing. The space defined by the second leg is dimensioned such that the edges of the sacrificial member slide within the spaces of the rigid retainers positioned at opposite sides of the frame so as to facilitate removal and positioning of the sacrificial member. In one embodiment, the second leg is further adapted to permit a fastener to extend into the space so as to inhibit sliding of the sacrificial member.

The rigid retainer positioned in the recess in the frame remains in place when the sacrificial member is replaced. The rigid retainer is formed from a resilient material to permit repeated use as sacrificial member is replaced repeatedly, and in one embodiment the rigid retainer is formed from a metal. Such rigid retainer is used to retrofit a mass transit vehicle such as a bus.

Another aspect of the invention relates to a method of replacing a sacrificial member of a window in a mass transit vehicle. The method comprises removing a rubber gasket from a recess formed in a frame of the window so that the rubber gasket no longer retains the sacrificial member adjacent a first side of a glazing of the window. The method further comprises removing the existing sacrificial member from the first side of the glazing. The method further comprises substituting the rubber gasket with at least one rigid retainer that is dimensioned to fit into the recess in the frame of the window and retain the sacrificial member adjacent the first side of the glazing. The method further comprises installing a new sacrificial member such that the at least one rigid retainer retains the new sacrificial member adjacent the first side of the glazing.

The rigid retainer preferably comprises a first leg sized to fit into the recess in the frame and a second leg that defines a spaced sized to receive the sacrificial member such that the sacrificial member is secured adjacent the first side of the glazing. The space defined by the second leg is dimensioned such that the edges of the sacrificial member slides within the spaces of the plurality of rigid retainers positioned at opposite sides of the frame.

Installing the new sacrificial member comprises sliding the upper edge of the sacrificial member into the space of the at least one rigid retainer positioned at the top of the frame so as to facilitate positioning of the lower edge of the sacrificial member into the space of the at least one rigid retainer positioned at the bottom of the frame. In one embodiment the second leg is further adapted to permit a fastener to extend into the space so as to inhibit sliding of the sacrificial member.

The rigid retainer is formed from a resilient material to permit repeated use as sacrificial member is subsequently replaced repeatedly, and in one embodiment the rigid retainer is formed from a metal. Such rigid retainer is used to replace the sacrificial member of the window in mass transit vehicles such as a bus.

Yet another aspect of the invention relates to a method of replacing a glazing of a window in a mass transit vehicle. The method comprises removing a rubber gasket from a recess formed in a frame of the window so that the rubber gasket no longer retains the glazing in the frame. The method further comprises removing the glazing from the frame, and installing a new glazing in the frame. The method further comprises substituting the rubber gasket with at least one rigid retainer that is dimensioned to fit into the recess formed in the frame and retain the glazing in the frame.

In one implementation, the method further comprises, after substituting the rubber gasket, installing a sacrificial member adjacent the glazing such that the sacrificial member is also retained by the at least one rigid retainer. In one embodiment, the rigid retainer comprises a first leg sized to fit into the recess in the frame and a second leg adapted to retain the glazing in the frame. The rigid retainer is formed from a resilient material to permit repeated use as glazing is subsequently replaced repeatedly. In one embodiment, the rigid retainer is formed from a metal, and such rigid retainer is used in mass transit vehicles such as a bus.

DETAILED DESCRIPTION OF THE PREFERRED EMBODIMENT

Figure 1:
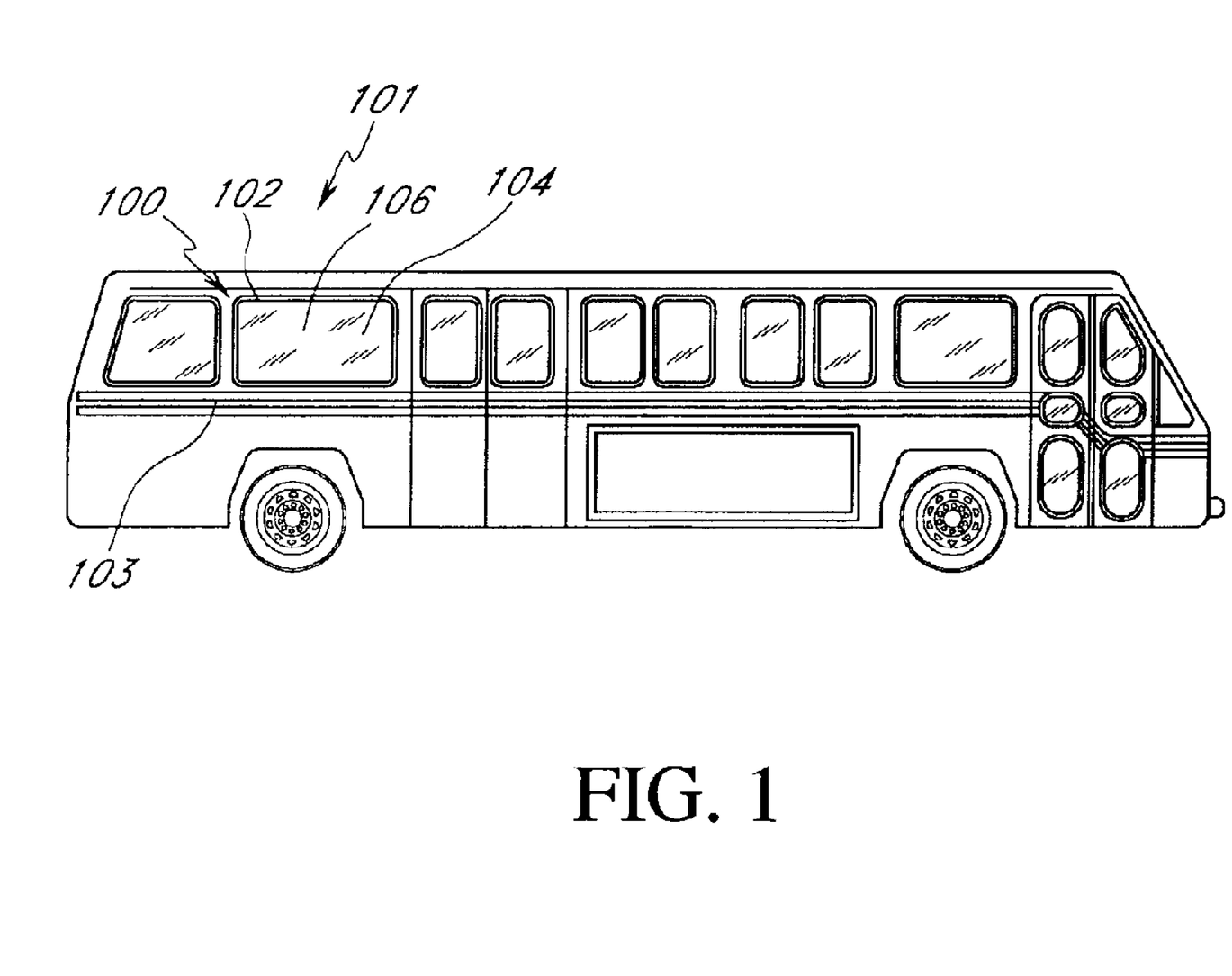
FIG. 1 illustrates a typical bus that exemplifies a common mass transit vehicle.

Reference will now be made to the drawings wherein like numerals refer to like parts throughout. FIG. 1 illustrates a bus 101 that exemplifies a common mass transit vehicle. The bus 101 comprises a plurality of windows 100 positioned at selected locations on side panels 103. Each window 100 comprises a glazing 104 mounted on a frame 102. It is common for the window 100 to further comprise a sacrificial member 106 that protects the glazing 104.

Figure 2A:
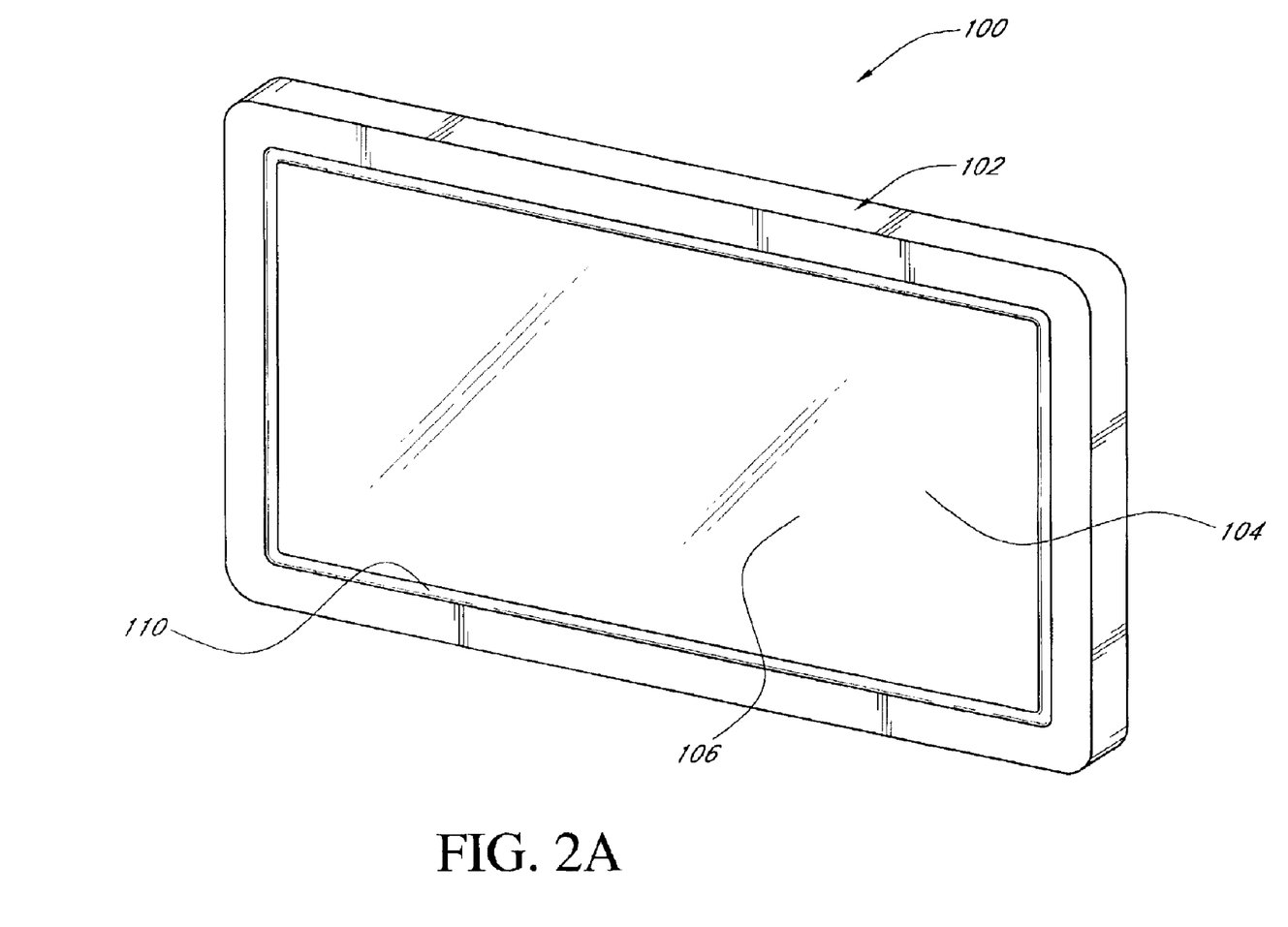
FIG. 2A illustrates a typical window assembly found on mass transit vehicles such as the bus of FIG. 1.

FIG. 2A illustrates an isolated view of one typical window 100 that might be found on mass transit vehicles such as the bus 101 of FIG. 1. The window 100 comprises the glazing 104 mounted on the frame 102. The window 100 may further comprise a sacrificial member 106 that forms a layer adjacent to the glazing 104, so as to provide a replaceable protective barrier between the glazing 104 and occupants of the vehicle. As is known in the art, windows in mass transit vehicles are subjected usual wear and tear as well as acts of intentional vandalism. The replaceable sacrificial member 106 protects the more costly glazing 104 from such mistreatments. Traditionally, the sacrificial member 106 is secured to the window 100 by a gasket 110 in a manner described below. One type of the costly glazing 104 is approximately ¼" thick, and one type of the sacrificial member 106 is less than ⅛" thick.

Figure 2B:
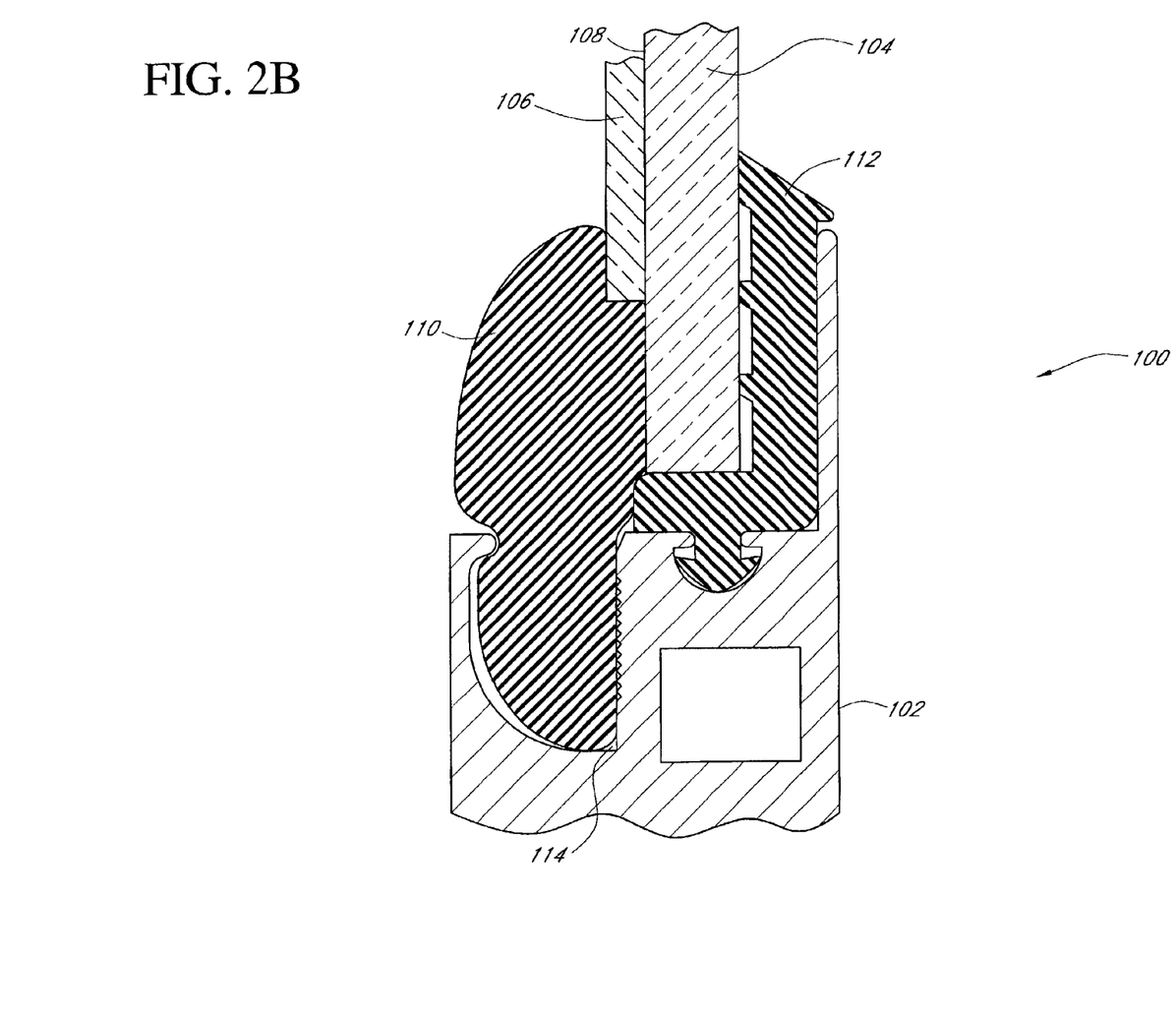
FIG. 2B illustrates a cross sectional view of a frame of the window assembly showing how a sacrificial member is traditionally mounted adjacent a glazing.

FIG. 2B illustrates a cross sectional side view of the frame 102, showing the glazing 104 mounted in the frame 102 with an external seal member 112 interposed therebetween. The seal member 112 seals out the exterior of the vehicle from the interior of the vehicle in a manner well known in the art.

The sacrificial member 106 is positioned in a layer adjacent a first side 108 of the glazing 104, and is secured in place by the gasket 110 that is pressed into a recess 114 defined by the frame 102. The gasket 110 is selected so as to permit it to securely hold the sacrificial member 106 in place. The gasket 110 may be secured in place either by frictional fit, or by an adhesive. The gasket 110 also retains the glazing 104 in the frame 102 adjacent the seal member 112.

Figure 3:
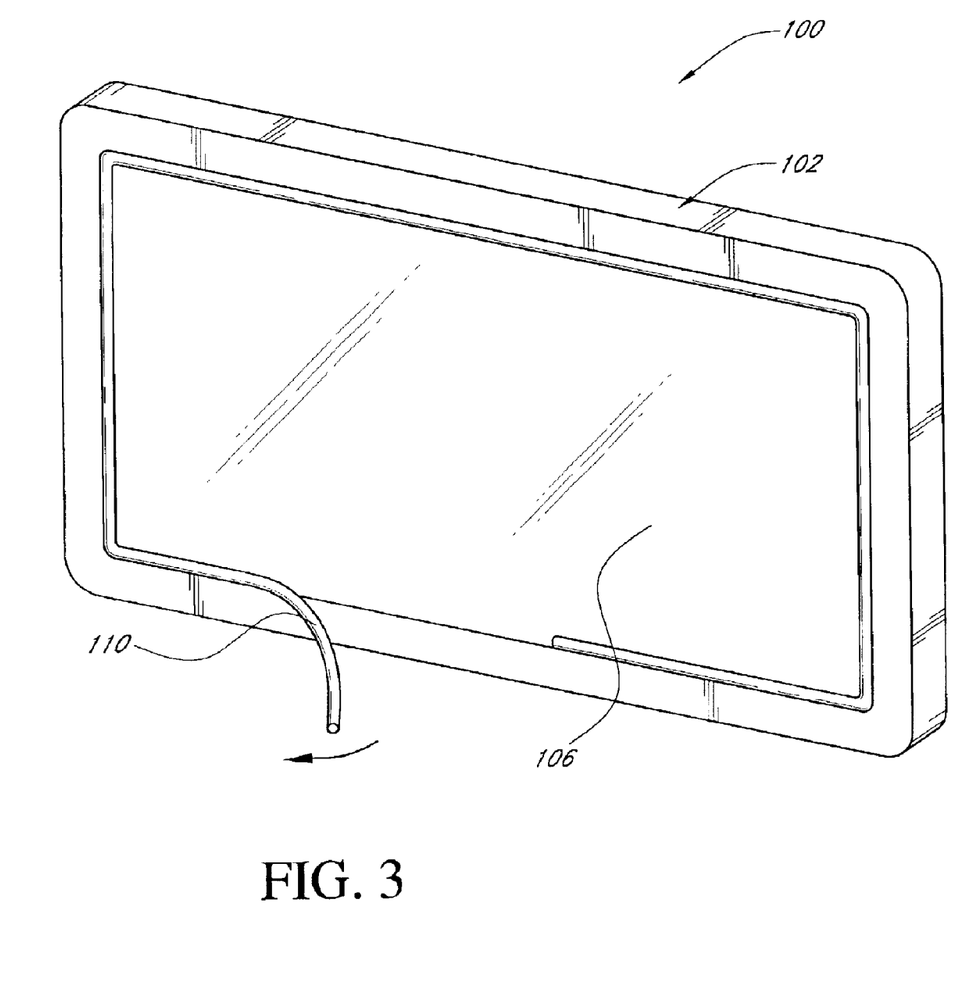
FIG. 3 illustrates a manner in which the sacrificial member is traditionally replaced.

FIG. 3 illustrates the traditional method of replacing the sacrificial member 106, wherein the gasket 110 is removed from the frame 102 so as to permit the sacrificial member 106 to be removed. As is well known in the art, once a gasket is removed from its fixed configuration of extended time, it loses some of its usefulness. Thus after several use over time, the gasket 110 may become brittle and cracked, rendering it unsuitable for further use. As a result, the gasket 110 typically needs to be replaced regularly, thus adding to the cost of time and material associated with the procedure. Since the gasket 110 also retains the glazing 104 in the frame 102, the gasket 110 needs to be removed when the glazing 104 is replaced. This further increases the cost of window maintenance when such gaskets are used. Aside from the material cost of the gasket, re-installing the gasket is labor-intensive, thus further adding to the cost of window maintenance.

Figure 4:
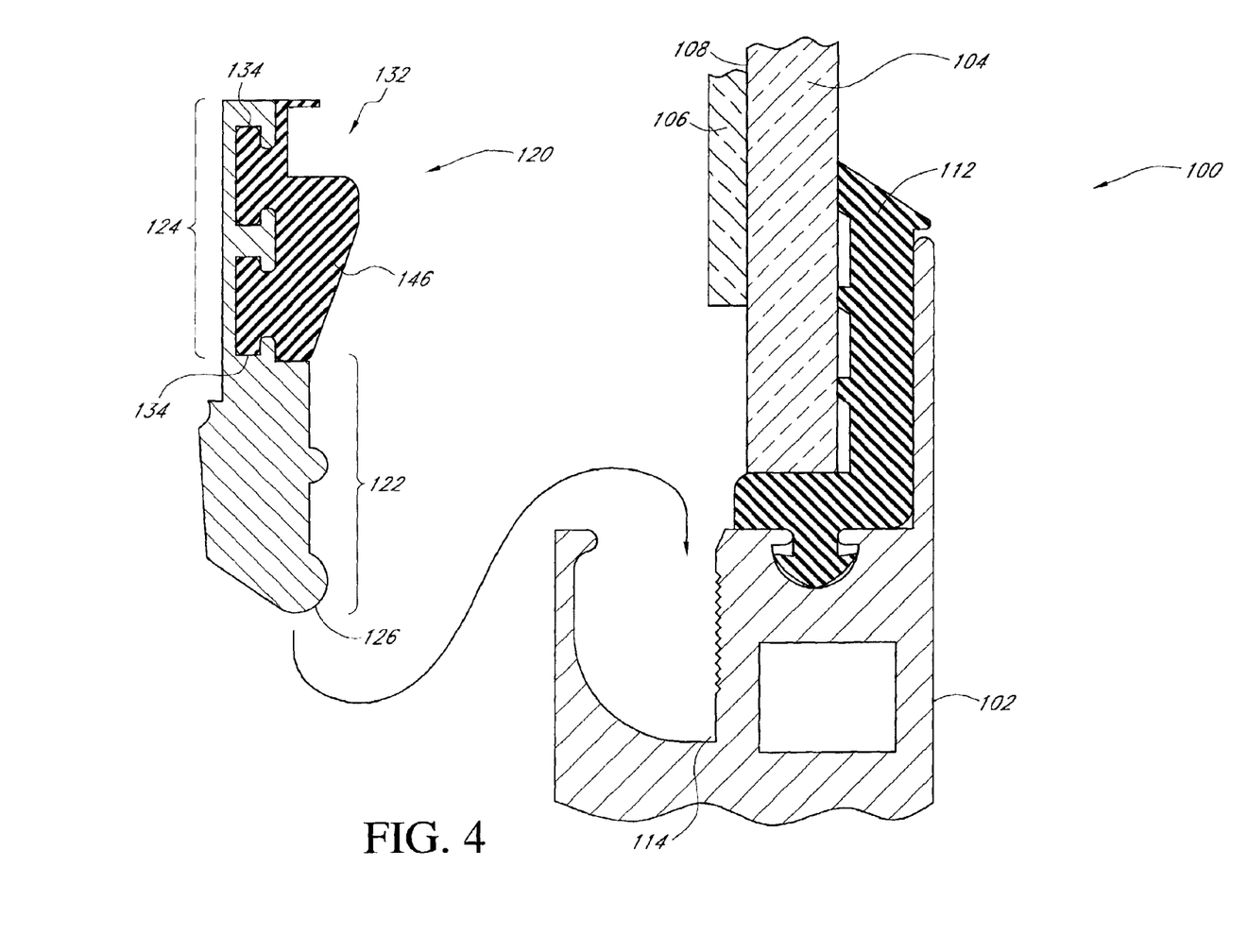
FIG. 4 illustrates a cross sectional view of the frame showing retrofitting of the window assembly with a retention member that retains the sacrificial member and the glazing.
Figure 5A:
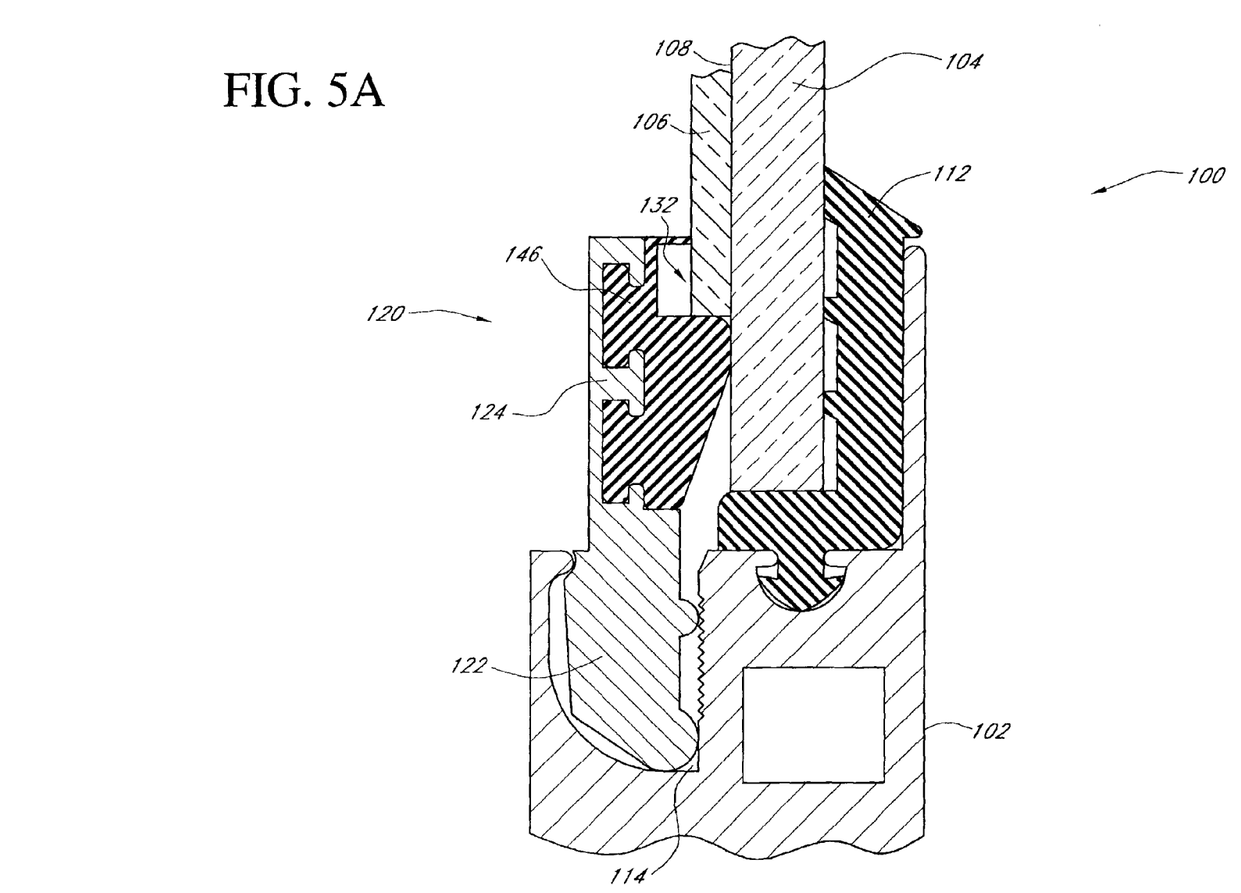
FIG. 5A illustrates a cross sectional view of the bottom portion of the frame showing the retrofitted window assembly.
Figure 5B:
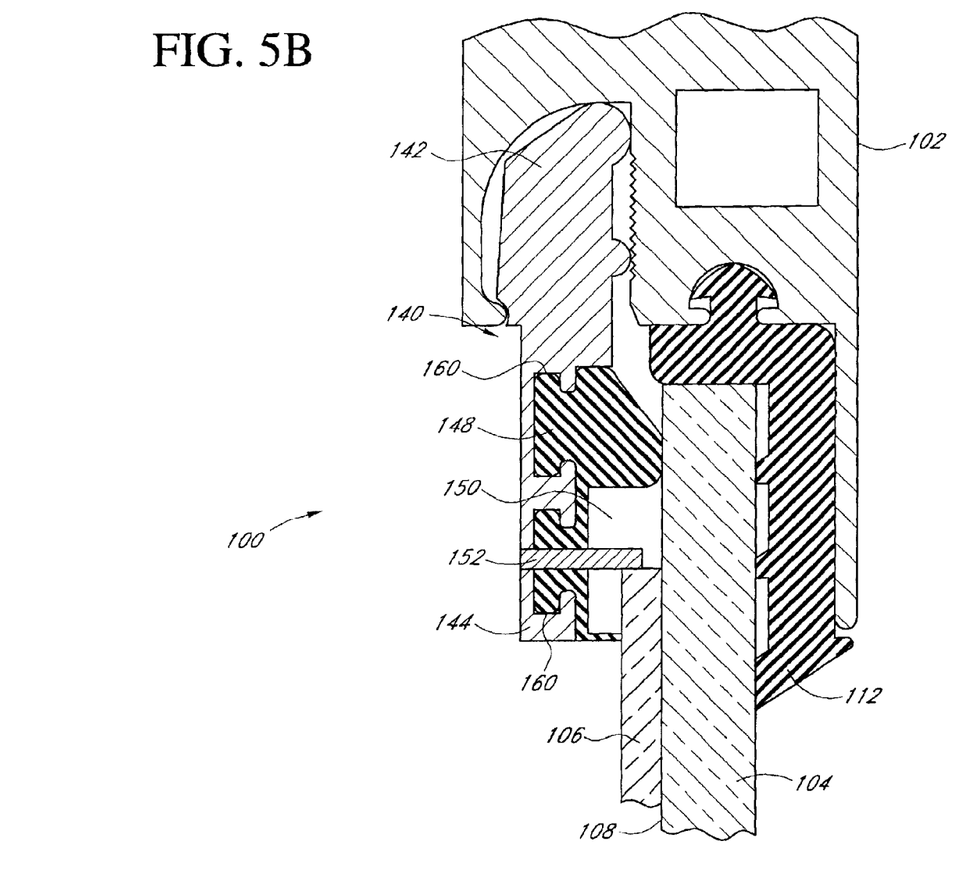
FIG. 5B illustrates a cross sectional view of the top portion of the frame showing a space defined by the retention member dimensioned so as to permit improved replacement of the sacrificial member.

FIGS. 4, 5A and 5B illustrate a process for retrofitting the window 100 so as to remove its dependence on the gasket 110 to secure the sacrificial member 106 and the glazing 104 in place. After the gasket 110 is removed from the frame 102, as described above in reference to FIG. 3, a retainer member 120 is inserted into the recess 114 that was previously occupied by the gasket 110. As shown in a cross sectional view in FIG. 4, one embodiment of the retainer member 120 comprises a first leg 122 and a second leg 124. The first leg 122 is sized to fit into the recess 114 that previously received the rubber gasket 110, and the second leg 124 is spaced outward from the first leg 122 so as to define a space 132 into which a sacrificial member 106 can be positioned adjacent the first side 108 of the glazing 104.

In one embodiment, the first leg 122 has a rounded end 126 so as to facilitate easier insertion into the recess 114. The first leg 122 further comprises a plurality of serrations 130 that helps to secure the first leg 122 in the recess 114. In one embodiment, the retainer member 120 further defines various openings 134 that can receive additional seals and the like.

Preferably, the retrofitting of the window 100 is performed when the sacrificial member 106 is replaced. It will be appreciated, however, that the retrofitting of the window 100 can be performed at any time without departing from the spirit of the invention.

FIG. 5A illustrates a cross sectional view of a retrofitted window 100, wherein the retainer member 120 has replaced the gasket 110 described above in reference to FIGS. 2 and 3. The first leg 122 engages the frame 102 such that the sacrificial member 106 can be received into the space 132 defined by the second leg 124, and held therein securely adjacent the first side 108 of the glazing 104.

As shown in FIG. 5A, the sacrificial member 106 is retained in place adjacent the first side 108 of the glazing 104 by one embodiment of a first seal 146 mounted in the openings 134 defined by the second leg 124. In particular, the first seal 146 engages the portion of the sacrificial member 106 and pushes it against the first side 108 of the glazing 104. Furthermore, the cross section of the first seal 146 defines a wedge whose tip engages the first side 108 of the glazing 104, thus retaining the glazing 104 securely adjacent the seal member 112. A portion of the wedge defined by the first seal 146 engages the edge of the sacrificial member 106 and inhibits the sacrificial member 106 from sliding beyond the first seal 146. In one embodiment, the first seal 146 is made from resilient rubber or hard vinyl so as to provide sealing and retaining properties in a reusable manner.

FIG. 5B illustrates another retainer member 140 that is similar to the retainer 120 described above. The retainer member 140 comprises a first leg 142 and a second leg 144, wherein the second leg 144 is adapted to permit a fastener 152 to extend into a space 150 defined by the second leg 144. The retainer member 140 is positioned on the opposite side from the retainer member 120 in order to permit the sacrificial member 106 to be installed and removed from the window in a manner similar to the process disclosed in a co-pending Provisional Application by Farrar titled "Sacrificial shield for window assembly", Ser. No. 09/820,184, filed on Mar. 27, 2001. The sacrificial member 106 is sized such that when installed, the fastener 152 extending into the space 150 inhibits the sacrificial member 106 from moving while occupying a portion of the space 150. To remove the sacrificial member 106, the fastener 152 is retracted from the space 150 so as to permit the sacrificial member 106 to slide into the rest of the space 150, thus freeing the other edge of the sacrificial member 106 from the space 132 described above in reference to FIG. 5A.

FIG. 5B further illustrates one embodiment of a second seal 148 mounted in openings 160 defined by the second leg 144. In particular, the second seal 148 engages the portion of the sacrificial member 106 and pushes it against the first side 108 of the glazing 104. Furthermore, the cross section of the second seal 148 defines a wedge whose tip engages the first side 108 of the glazing 104, thus retaining the glazing 104 securely adjacent the seal member 112. It will be appreciated that the process of retrofitting the portion of the window with the retainer member 140 is substantially similar to the process described above in reference to the retainer member 120. It will further be appreciated that other procedures (than that disclosed in Provisional Application No. 09/820,184) may be employed to install and remove the sacrificial member 106 from the window 100 without departing from the spirit of the invention.

Figure 6:
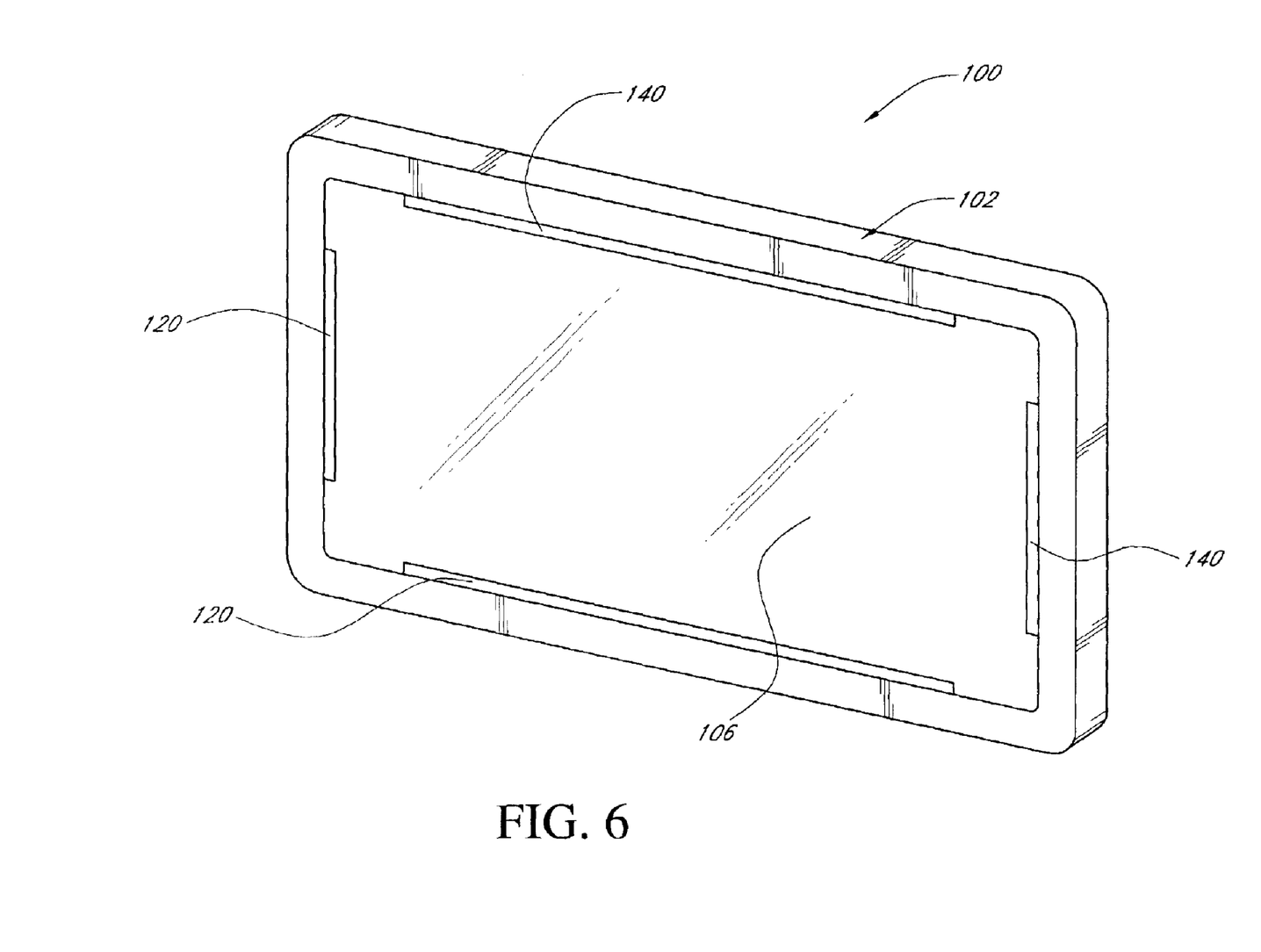
FIG. 6 illustrates one embodiment of the retrofitted window assembly with a plurality of retention members positioned at selected locations.

FIG. 6 illustrates an exemplary embodiment of the retrofitted window 100 comprising the retainer members 120 being positioned on the opposite sides of the retainer members 140 so as to permit installation and removal of the sacrificial member 106 as described above. In another embodiment of the retrofitted window 100, the retainer member 140 of FIG. 5B is substantially same as the retainer member 120 of FIGS. 4 and 5A. The window is retrofitted such that the retainer member positioned at the bottom of the window is fitted with the first seal 146 as described above in reference to FIG. 5A, and the retainer members positioned at the top and sides of the window are fitted with the second seal 148 described above in reference to FIG. 5B.

It will be appreciated that the retrofitted window 100 permits subsequent changes of the sacrificial members 106 to be performed in an easier manner. Furthermore, the retrofitted window 100 permits replacing of the glazing itself when necessary (such as when the glazing is damaged) in an improved manner described above. In one embodiment, the retainer members 120, 140 are formed from a resilient material such as plastic or vinyl so as to permit repeated use, thus providing cost savings by not discarding the traditional gaskets described above.

Although the foregoing description of the preferred embodiment described and pointed out the fundamental features of the invention, it will be understood that various omissions, substitutions and changes in the form of the detail of the apparatus and method as illustrated, as well as the use thereof, may be made by those skilled in the art, without departing from the spirit of the present invention.

What is claimed is:

1. A method of retrofitting an existing window assembly in a mass transit vehicle with a replacement sacrificial member retention assembly, the method comprising:

extracting a rubber gasket from at least one recess formed in a frame of the window so that the rubber gasket no longer retains the sacrificial member adjacent a first side of a glazing of the window assembly, wherein the rubber gasket also no longer retains the glazing in the frame;

sizing at least one rigid retainer so as to allow the at least one rigid retainer to be positioned in the at least one recess to thereby be positioned adjacent at least two opposed edges of the glazing;

positioning the at least one rigid retainer into the at least one recess in the frame such that the at least one rigid retainer is able to retain the sacrificial member adjacent the first side of the glazing, wherein the at least one rigid retainer is also able to retain the glazing in the frame; and positioning the sacrificial member adjacent the first side of the glazing so as to be retained by the at least one rigid retainer and wherein the at least one rigid retainer is sized such that when positioned in the at least one recess at opposed edges of the glazing, a space is defined adjacent a first edge of the sacrificial member and the at least one retainer wherein the space is sized so as to permit the first edge of the sacrificial member to be moved into the space a distance sufficient to expose an opposing edge of the sacrificial member from an opposing rigid retainer to thereby facilitate removal of the sacrificial member.

2. The method of claim 1 further comprising, prior to positioning a plurality of rigid retainers, positioning a replacement glazing in the frame.

3. The method of claim 1, wherein the at least one rigid retainer comprises a first leg sized to fit into the at least one recess in the frame and a second leg that defines the space sized to receive the sacrificial member such that the sacrificial member is secured adjacent the first side of the glazing.

4. The method of claim 3, wherein the second leg retains the glazing in the frame by engaging the portion of the first side of the glazing.

5. The method of claim 3, wherein the space defined by the second leg is dimensioned such that the edges of the sacrificial member slide within the spaces of the rigid retainers positioned at opposite sides of the frame so as to facilitate removal and positioning of the sacrificial member.

6. The method of claim 5, wherein the second leg is further adapted to permit a fastener to extend into the space so as to inhibit sliding of the sacrificial member.

7. The method of claim 6, wherein the rigid retainer positioned in the recess in the frame remains in place when the sacrificial member is replaced.

8. The method of claim 7, wherein the rigid retainer is formed from a resilient material to permit repeated use as sacrificial member is replaced repeatedly.

9. The method of claim 8, wherein the rigid retainer is formed from a metal.

10. The method of claim 1, wherein the mass transit vehicle is a bus.

11. A method of replacing a sacrificial member of a window in a mass transit vehicle, the method comprising:

removing a rubber gasket from a recess formed in a frame of the window so that the rubber gasket no longer retains the sacrificial member adjacent a first side of a glazing of the window;

removing the existing sacrificial member from the first side of the glazing;

substituting the rubber gasket with at least one rigid retainer that is dimensioned to fit into the recess formed in the frame of the window and retain the sacrificial member adjacent the first side of the glazing; and installing a new sacrificial member such that the at least one rigid retainer retains the new sacrificial member adjacent the first side of the glazing.

12. The method of claim 11, wherein the rigid retainer comprises a first leg sized to fit into the recess in the frame and a second leg that defines a space sized to receive the sacrificial member such that the sacrificial member is secured adjacent the first side of the glazing.

13. The method of claim 12, wherein the space defined by the second leg is dimensioned such that the edges of the sacrificial member slides within the spaces of the plurality of rigid retainers positioned at opposite sides of the frame.

14. The method of claim 13, wherein installing the new sacrificial member comprises sliding the upper edge of the sacrificial member into the space of the at least one rigid retainer positioned at the top of the frame so as to facilitate positioning of the lower edge of the sacrificial member into the space of the at least one rigid retainer positioned at the bottom of the frame.

15. The method of claim 14, wherein the second leg is further adapted to permit a fastener to extend into the space so as to inhibit sliding of the sacrificial member.

16. The method of claim 15, wherein the rigid retainer is formed from a resilient material to permit repeated use as sacrificial member is subsequently replaced repeatedly.

17. The method of claim 16, wherein the rigid retainer is formed from a metal.

18. The method of claim 11, wherein the mass transit vehicle is a bus.

19. A method of replacing a glazing of a window in a mass transit vehicle, the method comprising:

removing a rubber gasket from a recess formed in a frame of the window so that the rubber gasket no longer retains the glazing in the frame;

removing the glazing from the frame;

installing a new glazing in the frame; and substituting the rubber gasket with at least one rigid retainer that is dimensioned to fit into the recess formed in the frame and retain the glazing in the frame.

20. The method of claim 19 further comprising, after substituting the rubber gasket, installing a sacrificial member adjacent the glazing such that the sacrificial member is also retained by the at least one rigid retainer.

21. The method of claim 19, wherein the rigid retainer comprises a first leg sized to fit into the recess in the frame and a second leg adapted to retain the glazing in the frame.

22. The method of claim 21, wherein the rigid retainer is formed from a resilient material to permit repeated use as glazing is subsequently replaced repeatedly.

23. The method of claim 22, wherein the rigid retainer is formed from a metal.

24. The method of claim 19, wherein the mass transit vehicle is a bus.

* * * * *